United States Patent [19]

Maier et al.

[11] Patent Number: 5,299,366
[45] Date of Patent: Apr. 5, 1994

[54] FLUIDIZED BED TRANSPORT APPARATUS FOR COATING SMALL HARDWARE ITEMS

[75] Inventors: Elmar Maier, Felkirch-Tisis; Eckart Drössler, Thüringen, both of Austria

[73] Assignee: Hilti Aktiengesellschaft, Furstentum, Liechtenstein

[21] Appl. No.: 882,602

[22] Filed: May 13, 1992

[30] Foreign Application Priority Data

May 17, 1991 [DE] Fed. Rep. of Germany ....... 4116214

[51] Int. Cl.$^5$ ............................................. F26B 17/00
[52] U.S. Cl. ................................... 34/57 C; 34/57 A; 34/51; 118/303; 118/DIG. 5; 432/58
[58] Field of Search .............. 118/303, DIG. 5; 427/213, 10; 34/57 A, 51, 54, 57 C; 432/58; 422/143

[56] References Cited

U.S. PATENT DOCUMENTS

| | | | |
|---|---|---|---|
| 2,563,475 | 8/1951 | Mahoney | 118/303 |
| 2,995,773 | 8/1961 | Gidlow et al. | 427/213 |
| 3,136,531 | 6/1964 | Wesselingh | 34/57 A |
| 3,394,463 | 7/1968 | Futer | 34/57 C |
| 3,691,644 | 9/1972 | Schnitzer | 34/57 A |
| 3,951,099 | 4/1976 | Minckler | 118/DIG. 5 |
| 4,237,814 | 12/1980 | Ormos et al. | 118/303 |

Primary Examiner—Joseph W. Drodge
Attorney, Agent, or Firm—Anderson Kill Olick & Oshinsky

[57] ABSTRACT

Transport apparatus for small sized hardware items includes a fluidized bed with a sloping gas permeable base (6) at the inlet end of the bed. Gas feed chambers (6a, 6b, 6c, 6d) are located on the lowerside of the base (6) and are sealed from one another in a gas tight manner. Powder columns (2a, 2b, 2c, 2d) of different heights extend upwardly above the base (6). Gas at different pressures is supplied through the gas feed chambers (6a, 6b, 6c, 6d) into the powder columns forming a uniform fluidized bed (2). The base slopes downwardly and has step-like transitions adjacent intersections of the chambers.

4 Claims, 4 Drawing Sheets

FLUIDIZED BED TRANSPORT APPARATUS FOR COATING SMALL HARDWARE ITEMS

BACKGROUND OF THE INVENTION

The present invention is directed to a transport or conveying apparatus for small hardware items in a fluidized bed where an inclined gas-permeable base covers a plurality of gas supply chambers located on the lower side of the base.

Apparatus for the continuous heat treatment of granular material by a gas, in a sloping fluidized bed containing several gas supply chambers, has a material guiding flap at the inlet side and a baffle wall adjustable in height at the outlet side, as well as actuation means for regulating the gas supply, and is disclosed in DE-AS 21 01 143. In this apparatus a constant output is achieved using guidance and actuation means and a constant outlet temperature of the granules is attained by a constant gas temperature.

The gas inlet apertures of each gas feed or supply chamber are variable in cross-section by means of a perforated plate and an associated perforated slide.

The mechanical cross-sectional changes of the gap inlet apertures have disadvantageous effects. Based on the type of granular material used and on the temperature of the fluidized bed, disturbances can occur in the regulation means. Such disturbances can be caused by jamming of parts due to different heat expansions, by mechanical damage due to wear, or by contamination of the moving parts. Accurate adjustment of the cross-section of the gas inlet or feed apertures is no longer possible.

SUMMARY OF THE INVENTION

Therefore, it is the primary object of the present invention to provide a transport or conveying apparatus with a gas permeable base free of the above-mentioned disadvantages.

In accordance with the present invention, the gas feed chambers are sealed in a gas tight manner relative to one another and the gas pressure in each gas feed chamber is individually adjustable.

Each of the gas feed chambers has a powder column of a different height extending above it, that is, extending upwardly from the gas permeable base arranged in a sloping manner in a retort. Accordingly, the gas escapes along the path of least resistance and only the regions with the least powder height are fluidized. Due to the different heights of the powder on the surface of the base, different pressures result. The gas content of the individual gas feed chambers must be regulated to correspond with such pressure. The gas pressure available in a gas container with appropriately high storage pressure must be individually reduced for each gas feed chamber. In this apparatus, there is no reduction in the gas quantity.

Due to the adjustment of the pressure in the different gas supply chambers, any appropriate powder can be exposed to the gas. If a change is made to a powder with different fluidization properties, no changes are required in the gas feed chambers.

Based on the state of the art as disclosed in DE-AS 21 01 143, the pressure and the gas quantity are affected together or in common with every change of the gas inlet apertures. The amount of gas available to the entire gas permeable base is distributed in a variable manner among the gas feed chambers. In the present invention, all the gas feed chambers are provided with the same gas quantities, however, at different pressures.

Advantageously, the base is formed in a step-like manner at the transition between the individual gas feed chambers. The base is spaced upwardly from a common bottom plate for all of the gas feed chambers. The base forming the upper part of the gas feed chambers in the stepped arrangement has the surface of each step with an increasing height above the common bottom plate in the downwardly sloping direction of the bottom plate.

The base made up of the stair-like steps enables the material being processed to slide over the gas permeable base from one gas feed chamber to the next. The welding seams sealing the chambers from one another are recessed behind a gas permeable edge of the step. Accordingly, a formation of turbulent regions above the welding seams, which could cause the accumulation of powder, is prevented. Such accumulations of powder would remain in the shape of transverse ribs preventing the small-sized hardware items from sliding.

The angle of incidence of the common bottom plate of the gas feed chambers is preferably variable. The force of gravity is utilized by the slope of the common bottom plate to collect the small hardware items at a specific point within the retort. From such point, the items are transported further by a conveying device.

The base forming the cover of the gas feed chambers is formed as a sintered grate. The sintered grate is employed to ensure gas permeability. The sintered grate is a sandwich construction formed of several rust-free woven steel webs or layers. The layers are superimposed in a desired sequence and are sintered together under pressure and temperature.

Such sintered grates are commercially available. Other possibilities for providing for the gas permeability of the base is effected by bores in the base or by a base formed of a material with constant porosity.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive manner in which there are illustrated and described preferred embodiments of the invention.

DETAILED DESCRIPTION OF THE INVENTION

Figure 1:
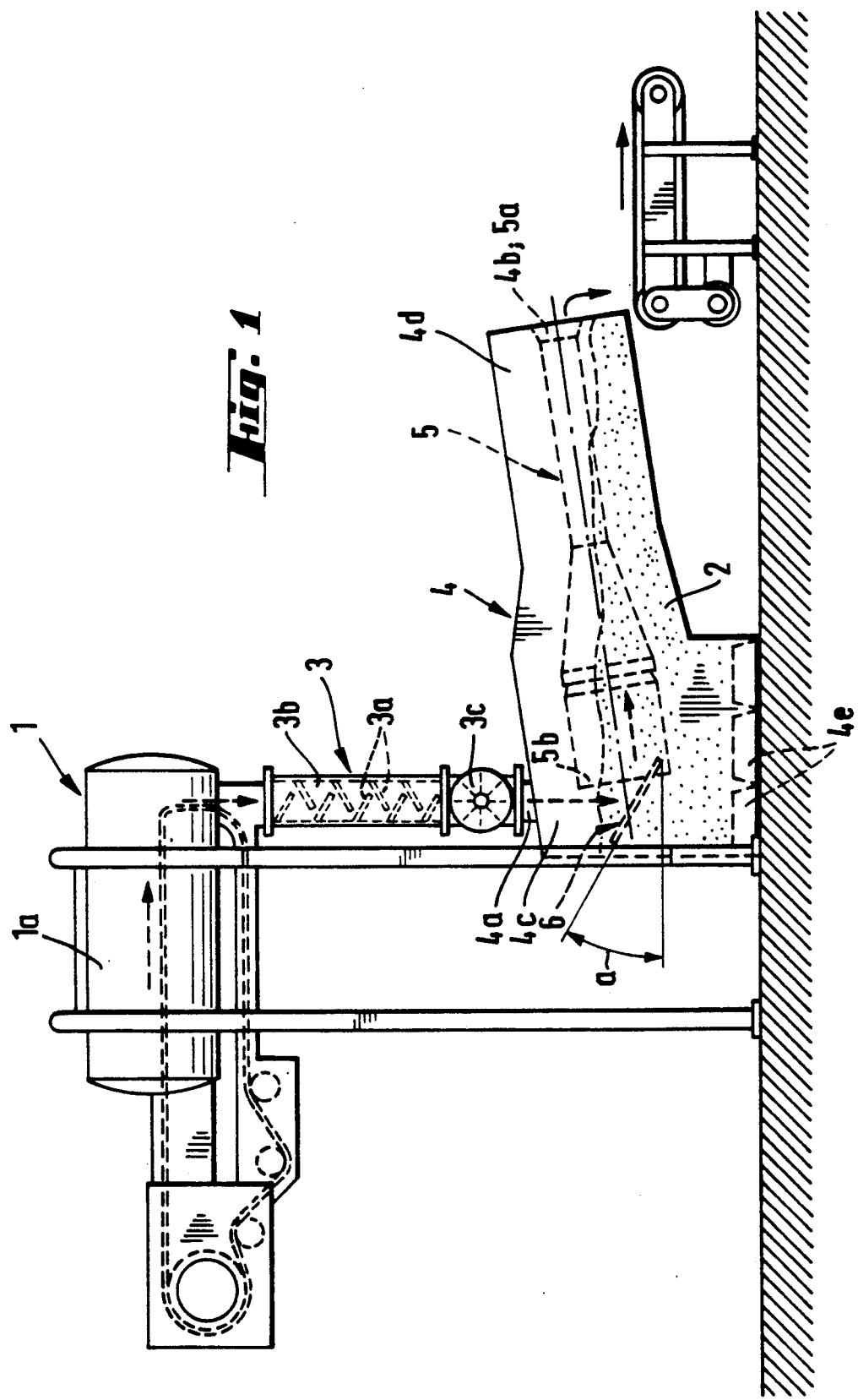
FIG. 1 is a diagrammatic showing of apparatus for hardening and surface coating small hardware items.

In FIG. 1 a heat treatment station 1 is shown where small hardware items, such as bolts or nails, are heated and subsequently directed downwardly into a fluidized bed 2. The heat content of the hardware items dropping downwardly into the fluidized bed 2 is decisive for the coating thickness to be melted onto the items.

To produce an appropriately thin coating, the high temperature of the hardware items exiting from the heating station 1 must be lowered. Accordingly, a cooling device 3 is arranged between the heat treatment station 1 and the fluidized bed 2. The cooling device 3 extends essentially vertically and is open at its opposite ends spaced apart in its long or axial direction. Cooling device 3 has a plurality of heat removal plates $3a$ located within it. The internal space $3b$ of the cooling device 3 is charged at the top with hot hardware items, which fall downwardly due to gravity, and contact in turn the plates $3a$. During downward fall of the hardware items, heat is removed before they end up in the fluidized bed 2 located in a generally horizontally arranged retort 4. Before passage of the hardware items into the fluidized bed 2 they pass through a bucket wheel lock $3c$ which affords a seal between the fluidized bed 2, where the items are quenched, and the superposed heat treatment furnace $1a$. Without the lock $3c$, volatile portions of the fluidized bed in the retort 4 could pass upwardly into the heat treatment furnace $1a$ and cause it damage. In the fluidized bed 2 there is a downwardly sloping base 6 over which the hardware items travel, with the help of gravity, to a specific location within the retort 4 where they are collected. From the collection point the hardware items are subsequently transported by a conveying device in the shape of a drum 5 to a discharge aperture $4b$ of the retort 4.

Figure 2:
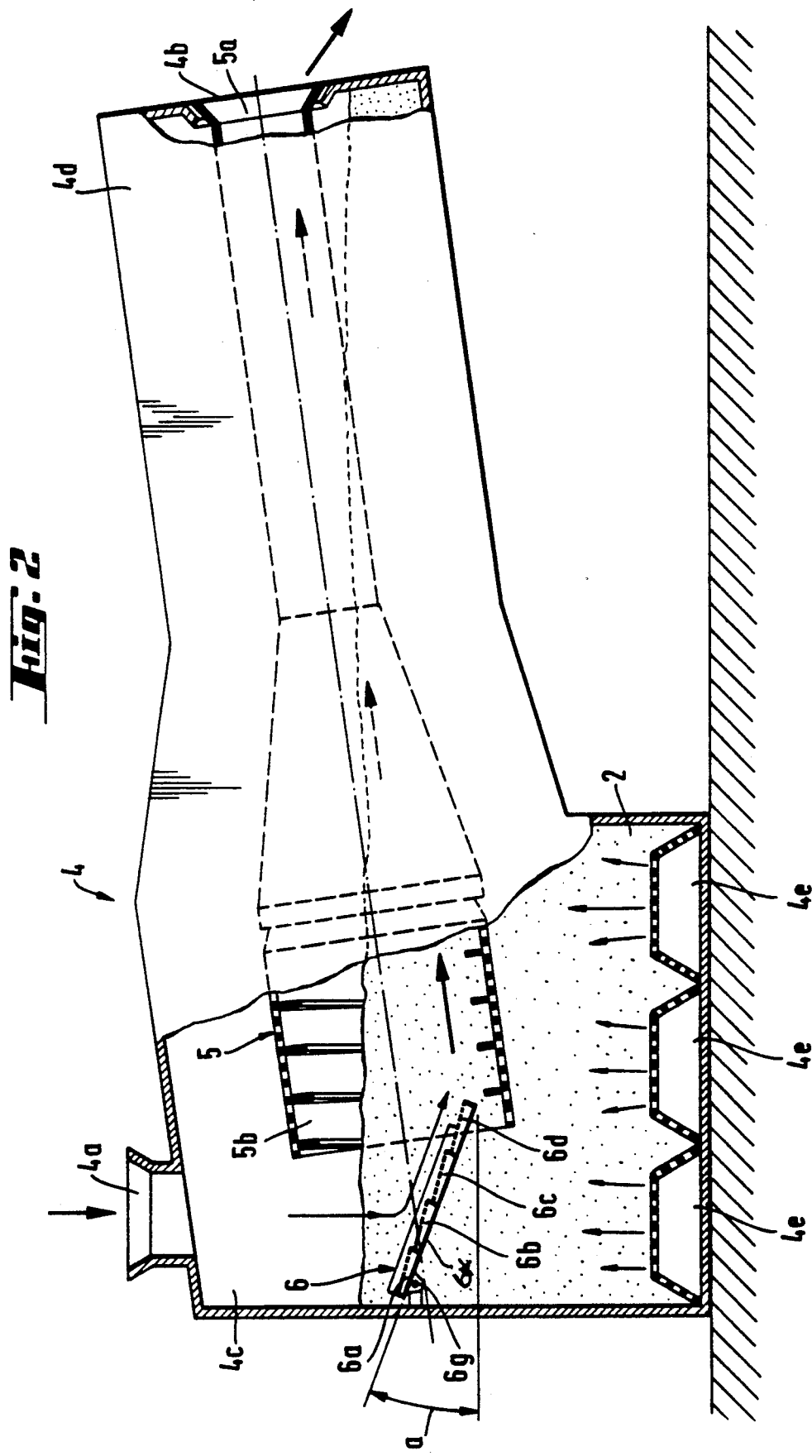
FIG. 2 is an enlarged partial cross-sectional view of the retort shown in FIG. 1.

FIG. 2 displays an enlarged elevational view of the retort 4, partly in cross-section, with a receiving or inlet aperture $4a$ located in a horizontal plane and a outlet or output aperture $4b$ located in a vertical plane. Retort 4 has its greatest volume in the receiving region $4c$ at the left hand end in FIG. 2 and its least volume in the outlet region $4d$ at the right hand end. The lowest point in the retort is in the receiving region $4c$. Within the retort 4 there is a generally horizontally arranged drum 5 with an internal helix, shown only in part, for conveying the hardware items through the drum from the receiving region $4c$ to the outlet region $4d$. The fluidized bed 2 within the retort 4 is maintained in the fluidized state by gas feed chambers $4e$ located at the lowest point in the retort, and also by gas feed chambers $6a$, $6b$, $6c$, $6d$ forming a part of the downwardly sloping base 6.

Preferably, the drum 5 is inclined so that its outlet region $5a$ is higher than the inlet region $5b$. The inlet region $5b$ of the drum extends for the most part into the fluidized bed 2. The depth of the drum 5 in the fluidized bed decreases toward the outlet region $5a$ so that the major part of the outlet region $5a$ is located above the fluidized bed, note FIG. 2.

The base 6 includes a common bottom plate $6x$ for each of the gas feed chambers and the bottom plate is arranged at an angle of incidence a inclined downwardly relative to the horizontal with the base aligned below the receiving aperture $4a$ of the retort 4. The base 6 moves the hardware items into the fluidized bed 2 at the receiving region end $5b$ of the drum, so that the hardware items are transported by the drum through the fluidized bed to the outlet region $5a$.

Figure 3:
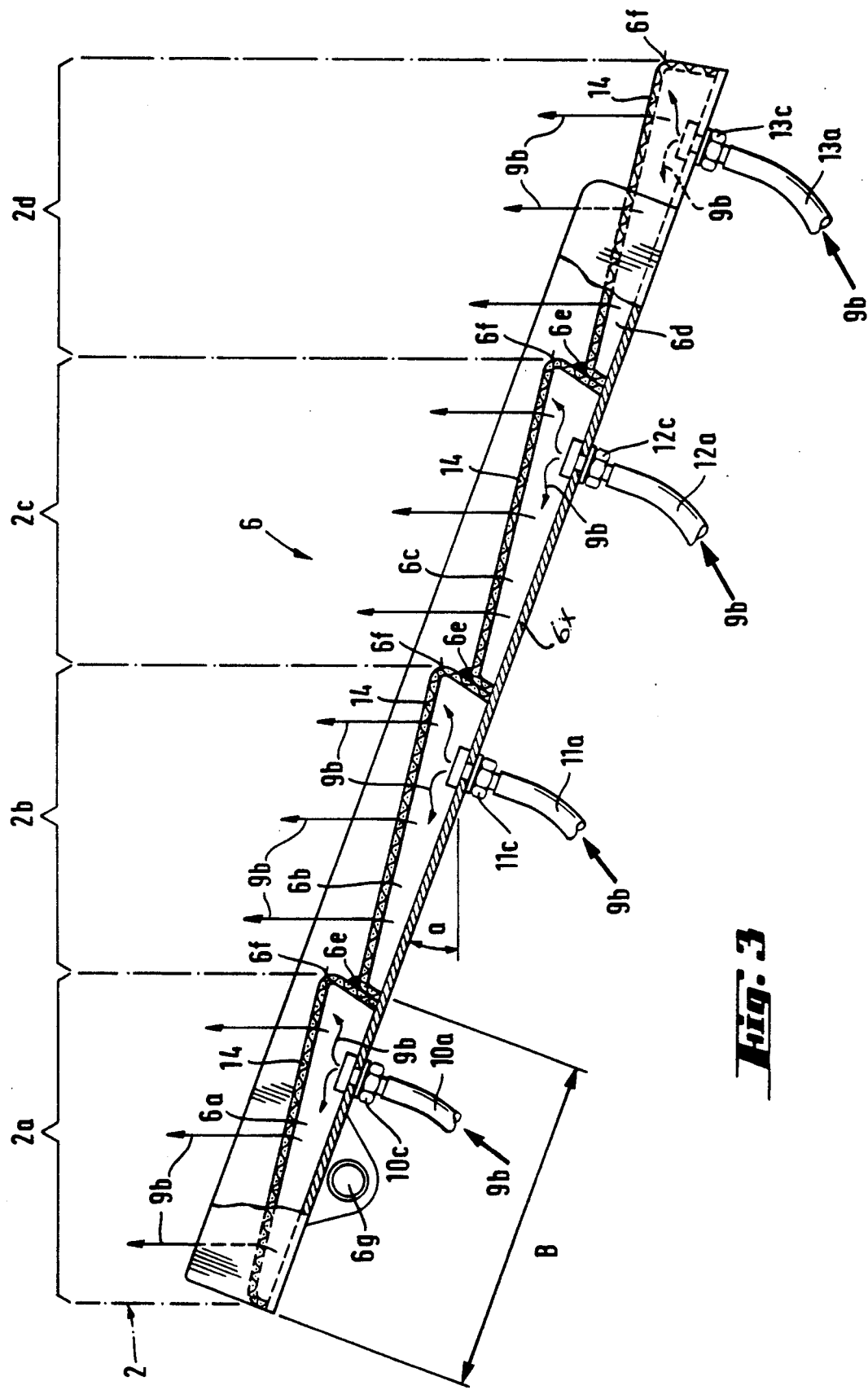
FIG. 3 is an enlarged elevational view, partly in section, of a gas permeable base shown in FIGS. 1 and 2.

In FIG. 3 the gas permeable base 6 is shown on an enlarged scale. The lower side of each of the gas feed chambers $6a$, $6b$, $6c$, $6d$ is formed by the downwardly inclined bottom plate $6x$, note that the plate $6x$ forms an angle of incidence a with the horizontal and slopes downwardly. The bottom plate $6x$ is divided into strips of a width B of preferably 100 mm. Each of the strips represent the bottom of the individual gas feed chambers $6a$, $6b$, $6c$, $6d$. The individual gas feed chambers are sealed in a gas-type manner with respect to one another, so that the hardware items slide on the gas permeable base 6 from one gas supply gas feed chamber $6a$, $6b$, $6c$, $6d$ to the other. The base has stair-like steps at the downward end of each strip B. Welding seams $6e$ which seal the gas feed chambers $6a$, $6b$, $6c$, $6d$ from one another are recessed below a gas permeable edge $6f$ at the downward end of each of the gas chambers. Without the recessed location of the welding seams $6e$ it would be expected that turbulent regions would form above the welding seams and result in accumulations of the powder forming the fluidized bed. Such powder accumulations would remain as transverse ribs and prevent the hardware items from sliding over the base 6.

The gas permeability of the base 6 is afforded by a sintered grate 14. Sintered grate 14 is a sandwich construction made up of several rust-free woven steel webs or layers. The webs or layers are superimposed in the desired sequence and are sintered together under pressure and temperature.

Figure 4:
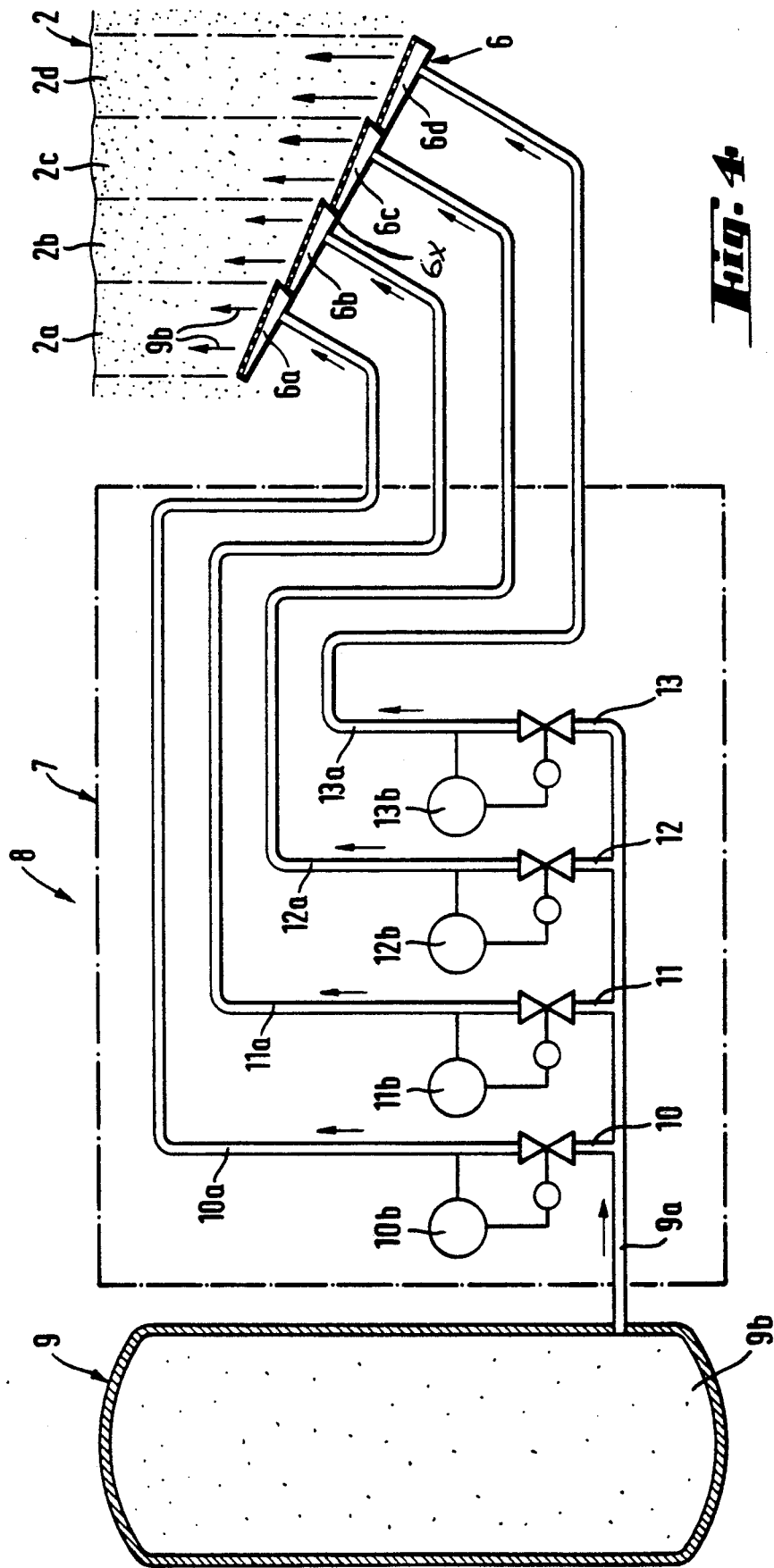
FIG. 4 is a diagram of a gas pressure device for use with the gas permeable base shown in FIG. 3.

As shown in FIGS. 2 and 3, toward the upper end of the bottom plate $6x$ there is a hinge $6g$ secured to the bottom plate so that the inclination of the base 6 can be changed. As shown in FIG. 4, gas feed lines $10a$, $11a$, $12a$, $13a$, with appropriate union connections $10c$, $11c$, $12c$, $13c$ are located at the lower side of the gas feed chambers $6a$, $6b$, $6c$, $6d$. If desirable, the gas feed lines $10a$, $11a$, $12a$, $13a$ can be located at the side of the gas supply chambers $6a$, $6b$, $6c$, $6d$. the gas supply chambers $10a$, $11a$, $12a$, $13a$ enable the gas $9b$ at different gas pressures, controllable by a regulation device not shown, to flow into the different gas feed chambers.

In FIG. 4 a gas pressure control 8 is shown in connection with a storage container 9 with a control device 7 and the base 6 of the gas feed chambers $6a$, $6b$, $6c$, $6d$ shown diagrammatically. The base 6 is mounted within the retort 4 in a downwardly inclined manner so that a powder column $2a$, $2b$, $2c$, $2d$ of different heights extends upwardly above each of the corresponding gas feed chambers $6a$, $6b$, $6c$, $6d$. Due to the different powder column heights, a different pressure acts on the gas permeable base 6 at each of the gas feed chambers. Accordingly, the gas pressure in the gas feed chamber $6a$, $6b$, $6c$, $6d$ must be matched to such pressure. A main line $9a$ extends from the storage container 9 to each of the individual lines 10, 11, 12, 13 so that the gas $9b$ can flow to each of the individual gas feed chambers. Each of the individual lines 10, 11, 12, 13 is connected with a corresponding control or regulation unit $10b$, $11b$, $12b$, $13b$, which controls the gas pressure in the individual gas feed chambers $6a$, $6b$, $6c$, $6d$. Accordingly, the gas pressure in each of the gas feed chambers $6a$, $6b$, $6c$, $6d$ can be regulated.

With the adjustment of the pressure within the gas feed chambers, any powder can be used in the fluidized bed. No design changes of the base 6 or of the gas feed chambers $6a$, $6b$, $6c$, $6d$ are needed if a powder with other fluidization characteristics is utilized. With an adequate pressure gradient between the storage container 9 and the individual control units $10b$, $11b$, $12b$, $13b$, an individual pressure control for the gas feed chambers $6a$, $6b$, $6c$ $6d$ is possible without requiring a reduction of the gas quantity. As a result, all gas feed chamber $6a$, $6b$, $6c$, $6d$ can be supplied with the same quantity of gas but at different gas pressures.

While specific embodiments of the invention have been shown and described in detail to illustrate the application of the inventive principles, it will be understood that the invention may be embodied otherwise without departing from such principles.

We claim:

1. Transport apparatus for small sized hardware items comprising an enclosure (4) containing a fluidized bed, a downwardly sloping gas permeable base (6) over which the hardware items move from a first end of the base to a second end and including feed chambers (6a, 6b, 6c, 6d) subjacent to the base (6) and disposed one following the other from the first end to the second end, wherein the improvement comprises that the gas feed chambers (6a, 6b, 6c, 6d) have a common bottom plate (6x) located downwardly below the base (6) and are sealed relative to one another in a gas-tight manner, means for individually regulating the gas pressure in each of said gas feed chambers (6a, 6b, 6c, 6d), the base (6) between the first end and the second end being shaped in a step-like manner at respective transitions between each of said gas feed chambers (6a, 6b, 6c, 6d) and the height of the base (6) above the bottom plate (6x) increasing in a downwardly sloping direction of the bottom plate (6x) toward each of said transitions.

2. Transport apparatus, as set forth in claim 1, wherein an angle of incidence (a) of said bottom plate (6x) is adjustable relative to the horizontal.

3. Transport apparatus, as set forth in claim 2, wherein said base (6) is a permeable sintered grate (14).

4. Transport apparatus, as set forth in claim 3, wherein said sintered grate (14) is made up of a plurality of superposed permeable webs sintered together.

* * * * *